United States Patent

Muendlein et al.

[11] Patent Number: 5,188,490
[45] Date of Patent: Feb. 23, 1993

[54] TOOL WITH ADJUSTABLE INTERCHANGEABLE CARTRIDGE

[75] Inventors: Werner Muendlein, Bietigheim-Bissingen; Gerhard Scheer, Loechgau, both of Fed. Rep. of Germany

[73] Assignee: Komet Stahlhalter-und Werkzeugfabrik Robert Breuning GmbH, Besigheim, Fed. Rep. of Germany

[21] Appl. No.: 773,569
[22] PCT Filed: May 12, 1990
[86] PCT No.: PCT/EP90/00769
   § 371 Date: Nov. 1, 1991
   § 102(e) Date: Nov. 1, 1991
[87] PCT Pub. No.: WO90/14186
   PCT Pub. Date: Nov. 29, 1990

[30] Foreign Application Priority Data

May 20, 1989 [DE] Fed. Rep. of Germany ....... 3916564

[51] Int. Cl.5 ............................................. B23B 51/00
[52] U.S. Cl. ...................................... 408/146; 407/44; 408/713
[58] Field of Search ............... 408/146, 186, 187, 188, 408/190, 191, 179, 200, 233, 713; 407/36, 38, 44

[56] References Cited

U.S. PATENT DOCUMENTS

| | | | |
|---|---|---|---|
| 3,195,376 | 7/1965 | Bader | 408/713 |
| 3,295,187 | 1/1967 | Plummer | 408/713 |
| 3,782,849 | 1/1974 | Mizoguchi | 408/146 |
| 3,839,772 | 10/1974 | Shimomura et al. | 407/36 |
| 3,847,555 | 11/1974 | Pegler et al. | 407/36 |
| 4,043,697 | 8/1977 | Eckle | 408/233 |

FOREIGN PATENT DOCUMENTS 3327478 2/1985 Fed. Rep. of Germany ...... 408/233

Primary Examiner—Daniel W. Howell
Attorney, Agent, or Firm—Flynn, Thiel, Boutell & Tanis

[57] ABSTRACT

A tool for use in machine-tools with a cutting head (14) has at least one interchangeable cartridge (24) which can be releasably fastened to the cutting head and which carries an interchangeable insert. The interchangeable cartridge can be adjusted on the cutting head in the advance direction of the insert by the action of an adjustment mechanism. The adjustment mechanism has a tapered ram (46) which can move along a guide (42) of the cutting head (14) arranged parallel to the plane of the insert and essentially perpendicular to the advance direction of the cutting head (14). The tapered ram has a tapered surface (44) which is inclined at an acute angle to the direction of sliding and which is contiguous with an inclined shoulder (54) of the interchangeable cartridge which makes a right angle, in the direction of the inclined tapered surface, with the advance direction. In order to transfer the torsional stresses produced by the cutting force on the blade of the tool to the cutting head (14) without stressing the means for securing the interchangeable cartridge (24), the inclined shoulder (54) and the facing tapered surface (44) also have an inclined undercut perpendicular to the inclined tapered surface and transverse to the advance direction, which enables the interchangeable cartridge (24) to interlock with the conical ram (46).

19 Claims, 4 Drawing Sheets

TOOL WITH ADJUSTABLE INTERCHANGEABLE CARTRIDGE

FIELD OF THE INVENTION

The invention relates to a tool for use in machine tools with a cutting head and at least one interchangeable cartridge releasably fastenable on the cutting head and carrying an insert, preferably constructed as an interchangeable plate, which interchangeable cartridge can, under the action of an adjustment mechanism, be adjusted on the cutting head in advance direction of the insert.

BACKGROUND OF THE INVENTION

Tools with adjustable interchangeable cartridges can relatively easily be adapted to different workpiece dimensions and machining tasks and can therefore be utilized more universally than special tools with nonadjustable inserts. This advantage has mainly an effect on small and medium workpiece series such that few universal tools are sufficient and that a plurality of special tools need not be manufactured and kept in storage. On the other hand, the adjustability and the thus needed division of the tool into several parts causes difficulties with respect to stability and strength, which could often not be satisfactorily solved with the presently known jointed structures in order to meet high performance requirements. Thus, it has already been suggested to adjust the interchangeable cartridge with the help of an adjusting screw guided in advance direction of the cutting head and resting loosely against an edge of the interchangeable cartridge to the desired cutting depth, and to thereafter clamp same on the cutting head with the help of a fastening screw. A tilting moment (or torque) is applied during the machining operation around the rearward bearing edge of the interchangeable cartridge at the cutting head, which bearing edge is adjacent to the main cutting edge, through the insert onto the interchangeable cartridge. The tilting moment must be completely absorbed by the fastening screw since the adjustment screw does not contribute anything toward absorbing this tilting moment. One must add that in the case of a rotating tool the centrifugal forces acting on the interchangeable cartridge of the known tool also must be absorbed exclusively by the fastening screw. Both types of stress reduce the stability particularly at the high speeds desired today.

SUMMARY OF THE INVENTION

Starting out from this, the basic purpose of the invention is to take steps, with which the forces and moments acting on the interchangeable cartridge during the machining operation, can be introduced better than up to now into the cutting head, and thus the total stiffness of the tool of the above-disclosed type can be increased.

The invention is based on the thinking that the adjustment mechanism, which rests regularly with an edge opposite the edge of the insert against the interchangeable cartridge, must in addition be constructed such that through it torque acting on the interchangeable cartridge and resulting from the cutting force can be transferred to the cutting head while relieving the fastening means holding the interchangeable cartridge on the cutting head. In order to achieve this, the invention suggests the following combination of characteristics:

The adjustment mechanism has a tapered ram which is movable along a guide on the cutting head, which guide is aligned parallel with respect to the insert plane and essentially transversely with respect to the advance direction;

The tapered ram rests with a tapered surface, defining an acute angle with its direction of movement and forming an inclined tapered surface, flat against an inclined shoulder on the interchangeable cartridge, which inclined shoulder deviates, in direction of the inclined tapered surface, from a right angle with respect to the advance direction;

The inclined shoulder and the opposing tapered surface have, in addition, and transversely with respect to the inclined tapered surface, an undercut forming an interlock between the interchangeable cartridge and the tapered ram.

The inclined shoulder and the opposing tapered surface have, according to a preferred embodiment of the invention, transversely with respect to the inclined tapered surface, in addition, an inclined undercut forming an interlock between the interchangeable cartridge and the tapered ram and deviating from a right angle with respect to the advance direction. The latter can from a technical manufacturing standpoint be achieved particularly easily by the tapered ram being supported in a cylindrical guide shaft in a tapered ram guide, constructed as a cylindrical bore, for both axial movement and also rotational movement with an automatic alignment with respect to an inclined shoulder on the interchangeable cartridge, which inclined shoulder has an inclined undercut. The tapered ram is advantageously adjusted by a threaded pin, which axially extends into the tapered ram guide and is guided in a tapped hole of the cutting head.

In order to be able to further improve the transfer of the forces resulting from the cutting force into the cutting head, the tapered ram extends with its partially cylindrical surface, which opposes the tapered surface, into a corresponding partially cylindrical guide groove in the cutting head, which guide groove is open along its edge. The partially cylindrical guide groove is thereby for technical manufacturing reasons advantageously aligned with the cylindrical bore in the cutting head. The tapered ram is advantageously constructed as a cylindrical pin having at its one end a flat tapered cut and at its other end a cylindrical guide shaft.

In order to be able to transmit also forces which act on the interchangeable cartridge transversely with respect to the advance direction, for example, centrifugal forces, without stressing the fastening means to the cutting head, either the cutting head or the interchangeable cartridge has a guide groove aligned in advance direction in order to receive a guide rib formed on the other part (interchangeable cartridge or cutting head). The guide rib or rather guide groove is thereby advantageously arranged on the side of the interchangeable cartridge remote from the insert.

The interchangeable cartridge can advantageously be releasably fastened to the cutting head by means of a holding screw, which holding screw extends either through a hole arranged in the cutting head or a hole arranged in the interchangeable cartridge, which hole is elongated in advance direction, and which holding screw can be screwed into a tapped hole on the other part (interchangeable cartridge or cutting head).

According to a further advantageous embodiment of the invention, the cutting head has a bed recess open at its edge at least toward a chip flute in order to receive the interchangeable cartridge therein, with the tapered ram extending with its part having the tapered surface through an opening defining the tapered ram guide in the cutting head into the recess open along its edge. In order to keep the gaps occurring in the area of the chip flute during adjustment of the interchangeable cartridge as small as possible, it is advantageous to form a protective rib on the interchangeable cartridge, which protective rib extends over the inclined shoulder and the tapered ram on the side of the chip flute. The surface of the protective rib, which surface is aligned with the free insert surface, forms thereby advantageously a part of the chip flute boundary surface.

According to a further preferred development of the invention, the interchangeable cartridge is movable on the cutting head essentially in axial direction. The cutting head consists thereby advantageously of a base member and two tool holders which are connected to the base member preferably through transversely extending serrations and a common clamping plate and are radially adjustable with respect to the base member. Each tool holder has one of the axially adjustable interchangeable cartridges and contains the radially aligned tapered ram guides. The bed recess is open along its edge advantageously radially outwardly and axially toward the axial end, while the boundary walls of the interchangeable cartridge and of the bed recess, which boundary walls lie radially on the inside and are parallel to one another, define together with the cutting head axis an acute angle converging toward the axial end of the cutting head. An improved rigidity and a compact construction is achieved in the area of the insert bed with the last-mentioned measure.

The tool of the invention can be utilized advantageously for the rough machining of bores and thereby in particular as a two-blade roughing tool or a one-blade stepping tool. The teaching of the invention can further be applied advantageously to radial or axial grooving tools, in finish turning tools for short outer cylinders, in back facing tools and in chamfering tools. Finally, the use in two-tooth cutters and in combination tools with a selected combination from the above embodiments is also conceivable.

BRIEF DESCRIPTION OF THE DRAWINGS

The invention will be discussed in greater detail hereinafter in connection with one exemplary embodiment schematically illustrated in the drawings, in which.

DETAILED DESCRIPTION

Figure 4:
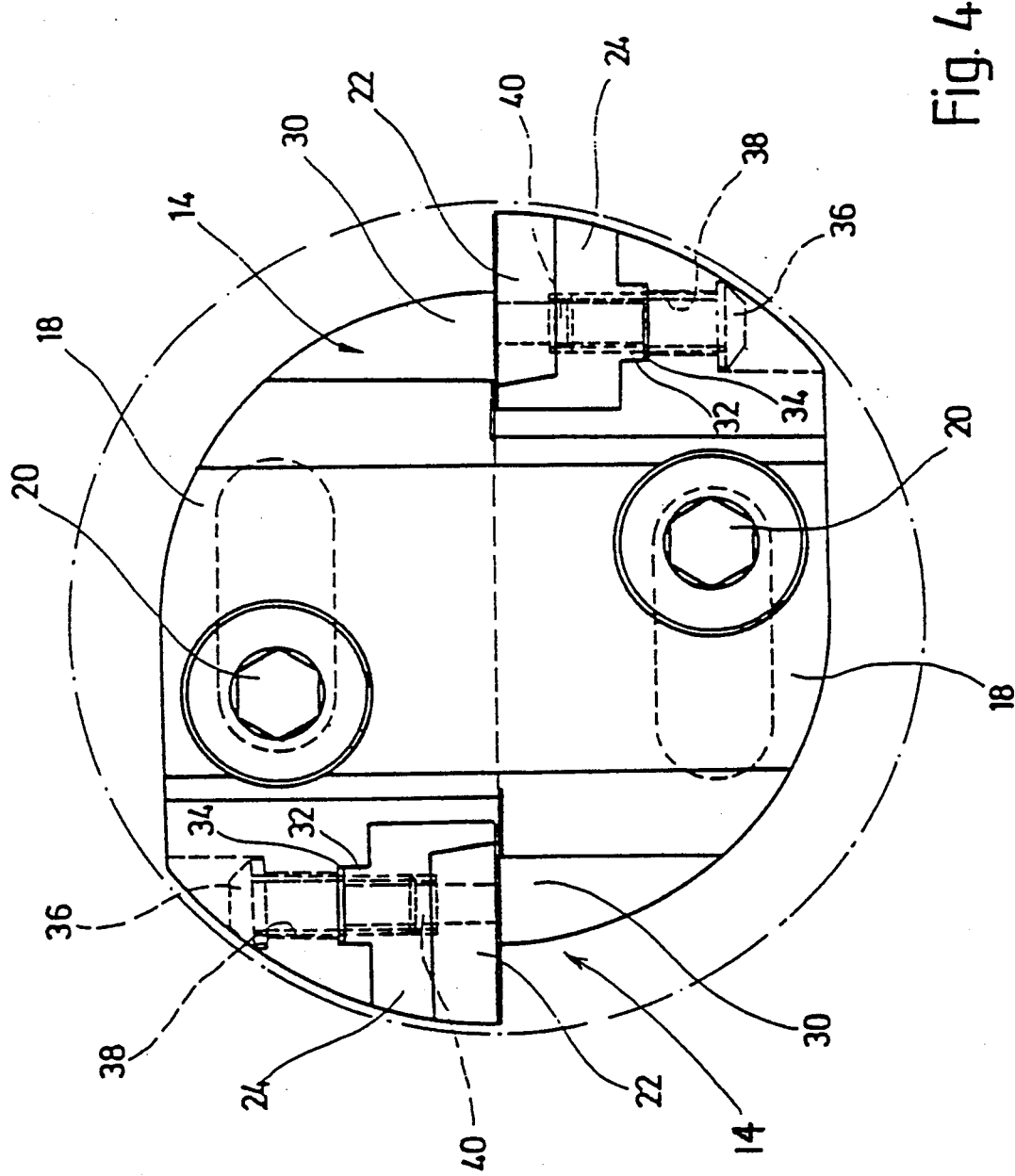
FIG. 4 is an end view of the two radially adjustable tool holders of the tool.
Figure 5:
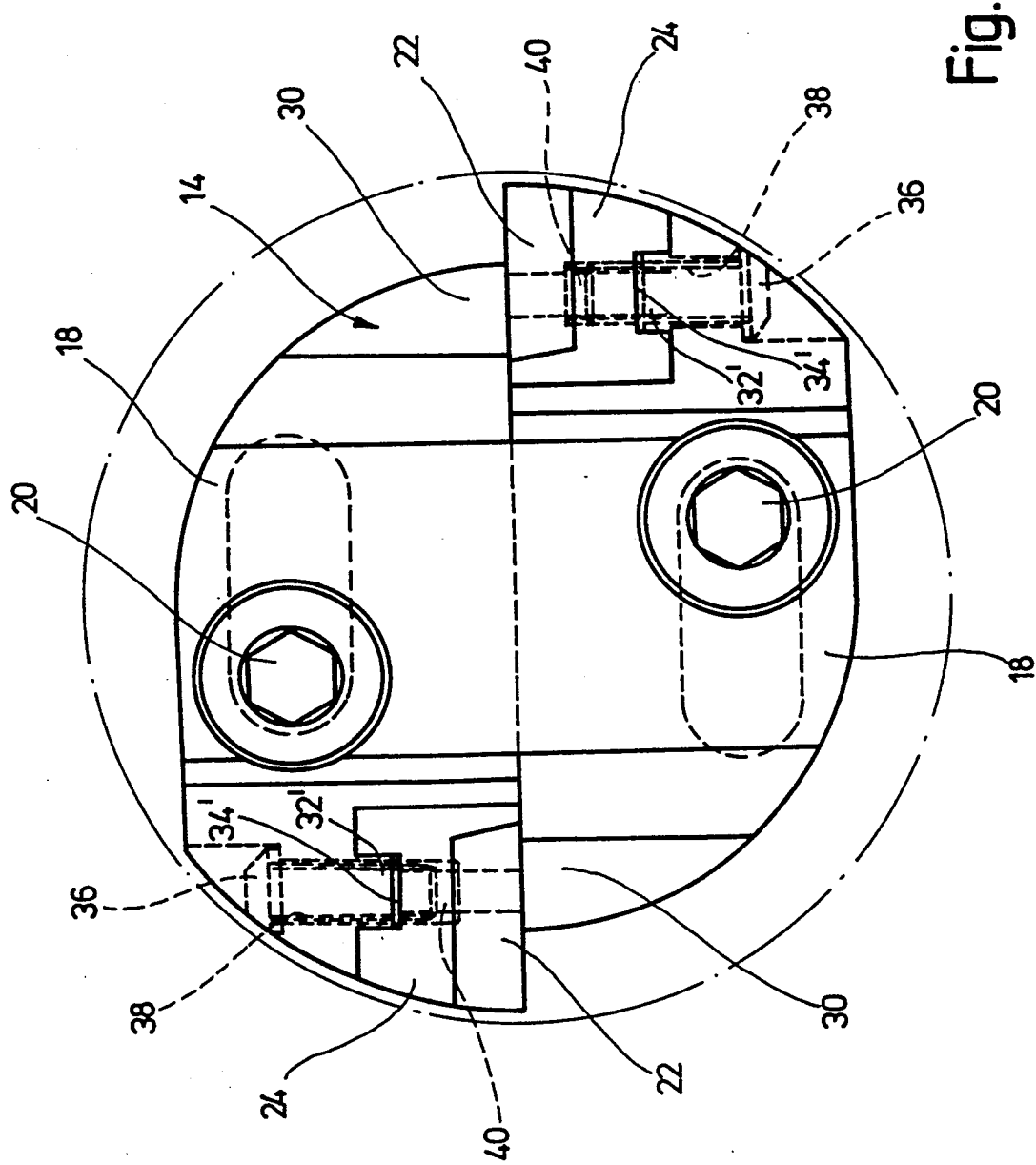
FIG. 5 is an end view of a modification to FIG. 4.

The two-bladed roughing tool illustrated in the drawings consists essentially of a base member 10 having a fitting pin 12 for connection to a machine spindle, two tool holders 14, which are adjustable relative to the base member radially along transversely extending serrations 16, can be fastened on the base member 10 by means of a clamping plate 18 and fastening screws 20, each interchangeable cartridge 24 being arranged axially adjustably on the tool holders and carrying an insert constructed as a reversible plate 22. The reversible plate, having a polygonal contour and three edges 23, is flat, planar and fastened by means of a hollow head cap screw 26 extending through a central bore in a bed of the interchangeable cartridge, which bed is adapted to the contour of the screw. The interchangeable cartridge 24 in turn is arranged in a bed recess 28 in the tool holder 14, which bed recess 28 is adapted to the contour of the interchangeable cartridge and is open both radially and toward the side of a chip flute 30 and at an axial end of the tool holder for the insertion of the respective edge surfaces of the interchangeable cartridge. A guide rib 32 is formed on a broad side of the interchangeable cartridge 24, which broad side lies opposite the reversible plate 22. The guide rib 32 extends into a guide groove 34 which is aligned axially parallel with respect to the axis of rotation of the tool on the tool holder. The guide rib 32 and guide groove 34 can, if desired, be oriented oppositely to that shown in FIG. 4, as shown at 32' and 34' in FIG. 5. This construction guarantees an axial mobility of the interchangeable cartridge with respect to the tool holder and a radial support and a force transmission between the interchangeable cartridge 24 and the tool holder 14. To fasten the interchangeable cartridge 24 to the tool holder 14, this is done with the help of a hollow head cap screw 36 which extends from the rear through a slotted hole 38 of the tool holder into a tapped hole in the area of the guide rib 32 on the interchangeable cartridge 24.

A radially extending fitting bore 42 is arranged in the tool holder 14 for the axial adjustment of the interchangeable cartridge 24. A tapered ram 46, constructed as a cylindrical pin having an inclined tapered surface 44, is arranged longitudinally movably and rotatably in the fitting bore 42. The fitting bore 42 transfers at its rear end into a tapped hole 45, in which tapped hole is arranged a threaded pin 48 for moving the tapered ram 46. The tapered ram 46 extends with its end having the tapered surface 44 substantially radially into the bed recess 28 and is there guided with its partially cylindrical outer surface 50, which lies opposite the tapered surface 44 in a partially cylindrical groove aligned with the respective part of the fitting bore 42 in the lower axial boundary wall of the bed recess 28.

Figure 3:
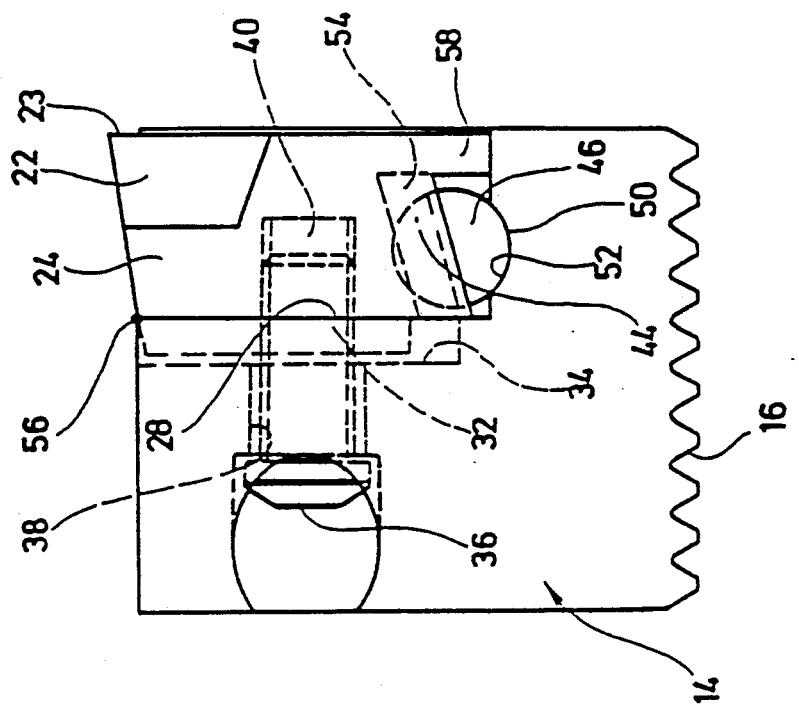
FIG. 3 is a side view in direction of the arrow III in FIG. 2.

The changeable cartridge has on another side in the area of its edge facing the tapered ram 46 an inclined shoulder 54, which is aligned inclined relative to the (axial) advance direction in two directions forming an incline corresponding with the inclined surface 44 and an inclined undercut. The inclined surface 44 defines, in the direction of movement of the tapered ram 46 in a radial plane, an angle (tapered angle) of approximately 12° (FIG. 2), while the inclined undercut defines in a direction perpendicular with the radial plane an angle of approximately 15° (FIG. 3). The undercut angle is thereby chosen such that during a tilting of the cartridge 24 about the axis of tilt 56, which tilting is caused by the action of the cutting forces on the edge 23, the interchangeable cartridge 24 cannot be lifted in the area of its inclined shoulder 54 out of the bed recess 28 due to a form-locking. The fastening screw 36, which is tightened after the adjusting operation, is thus substantially relieved from the torsional stresses produced by the cutting operation. The tapered ram 46 is, due to its rotatable support in the fitting bore 42 during the adjusting operation, automatically rotated into the inclined position illustrated in FIG. 3 by the inclined shoulder 54 on the interchangeable cartridge 24. The part of the bed recess 28, which part receives the tapered ram 46, is covered by a protective rib 58 toward the chip flute 30.

Figure 1:
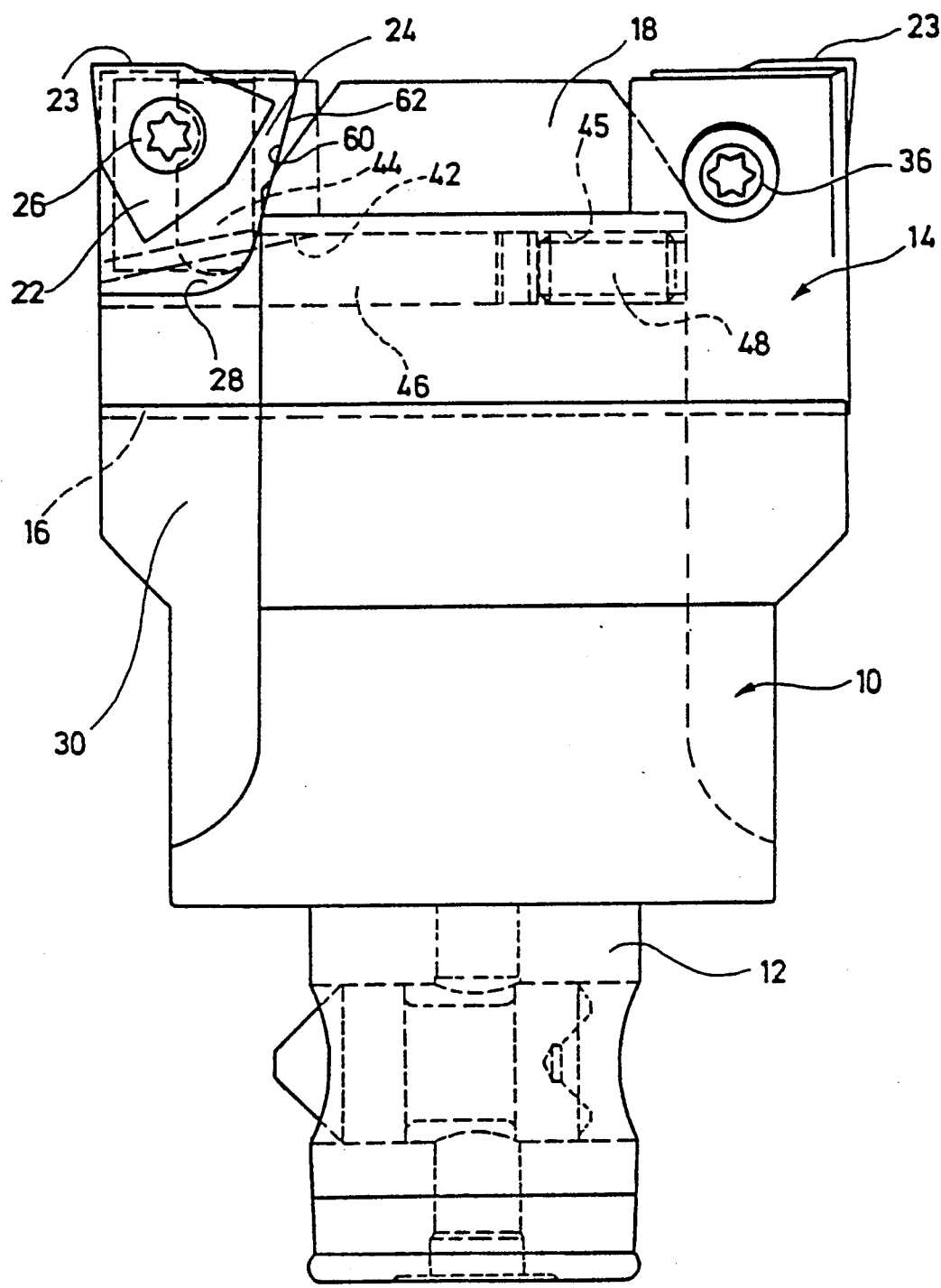
FIG. 1 is a side view of a two-bladed roughing tool with radially and axially adjustable inserts.
Figure 2:
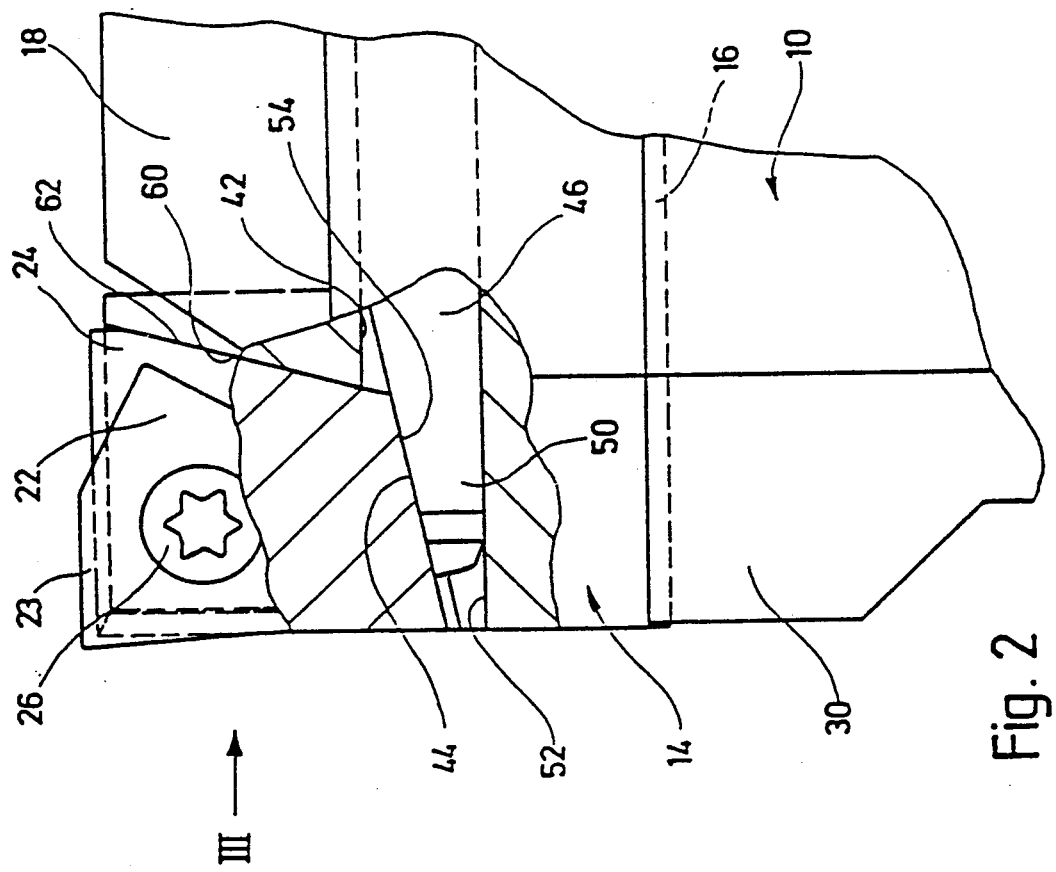
FIG. 2 is an enlarged, partially sectioned illustration of a fragment of FIG. 1.

As can particularly be seen in FIGS. 1 and 2, the radially inside boundary wall 60 of the bed recess 28 and the adjacent boundary surface 62 of the interchangeable cartridge 24 define an acute angle converging with the axis of the tool toward the axial end in order to assure that the tool holder still has a sufficient rigidity or rather stiffness in the area of the bed recess.

The embodiments of the invention in which an exclusive property or privilege is claimed are defined as follows:

1. In a tool for use in machine tools with a rotatably supported cutting head and at least one interchangeable cartridge releasably fastenable on the cutting head and carrying a planar interchangeable insert, which interchangeable cartridge is, with the aid of an adjustment mechanism, adjustable on the cutting head in a direction parallel to an axis of rotation of the cutting head, the improvement wherein the adjustment mechanism includes a tapered ram movable along a guide means on the cutting head, which guide means is aligned parallel with respect to a plane containing the planar interchangeable insert and substantially transversely with respect to the axis of rotation, wherein the tapered ram has an inclined tapered surface, which defining an acute angle with a longitudinal direction of movement thereof in said guide means, said inclined tapered surface resting flat against an inclined shoulder on the interchangeable cartridge, which inclined shoulder deviates, in direction of the inclined tapered surface, from a right angle with respect to the axis of rotation, and wherein the inclined shoulder and the opposing tapered surface, transversely with respect to the inclined tapered surface, define an interlock means between the interchangeable cartridge and the tapered ram for absorbing forces applied to said interchangeable insert.

2. The tool according to claim 1, wherein the guide means is a cylindrical bore, wherein the tapered ram is both longitudinally movably and also rotatably supported by the guide means so that an automatic alignment of the tapered surface with respect to the inclined shoulder of the interchangeable cartridge will occur.

3. The tool according to claim 1, wherein the tapered ram is movably driven by a threaded pin guided in a radially extending tapped hole of the cutting head.

4. The tool according to claim 2, wherein the guide means for the tapered ram includes a partially cylindrical surface part on said tapered ram which lies opposite the tapered surface and a corresponding partially cylindrical guide groove of the cutting head into which is slidingly received said cylindrical surface part.

5. The tool according to claim 4, wherein the partially cylindrical guide groove is aligned with the cylindrical bore.

6. The tool according to claim 1, wherein the tapered ram is formed by a cylindrical pin having a flat tapered surface at one end and a cylindrical guide shaft at an other end.

7. The tool according to claim 1, wherein the cutting head has a guide groove aligned with the axis of rotation, and wherein the interchangeable cartridge has a guide rib thereon received in the guide groove.

8. The tool according to claim 1, wherein the interchangeable cartridge has a guide groove aligned with the axis of rotation, and wherein the cutting head has a guide rib received in the guide groove.

9. The tool according to claim 8, wherein at least one of the guide rib and the guide groove is arranged on a side of the interchangeable cartridge remote from the insert.

10. The tool according to claim 1, wherein the interchangeable cartridge is fastened to the cutting head by means of a head screw extending through a hole elongated in a direction parallel to the axis of rotation and arranged in the cutting head, said head screw being rotatable into a tapped hole provided in the interchangeable cartridge.

11. The tool according to claim 1, wherein the interchangeable cartridge is fastened to the cutting head by means of a hollow head cap screw extending through a hole elongated in a direction parallel to the axis of rotation and arranged in the interchangeable cartridge and rotatable into a tapped hole provided in the cutting head.

12. The tool according to claim 1, wherein the cutting head has a bed recess which is open at its edge at least toward a chip flute in order to receive the interchangeable cartridge, and wherein the tapered ram and the tapered surface thereon extend through an opening in the cutting head into the bed recess.

13. The tool according to claim 12, wherein a protective rib is formed on the interchangeable cartridge, which protective rib extends over the bed recess in the area of the tapered ram on the side of the chip flute.

14. The tool according to claim 13, wherein a surface of the protective rib, which surface is in alignment with the plane of the insert, forms a part of the chip flute boundary surface.

15. The tool according to claim 1, wherein the interchangeable cartridge is movable in an axial direction of the tool.

16. The tool according to claim 12, wherein the bed recess is open at a radially outer edge and at an axial end thereof.

17. The tool according to claim 15, wherein the interchangeable cartridge and the bed recess have boundary walls, which are parallel with one another and define with the axis of rotation an acute angle converging toward an axial end of the cutting head.

18. The tool according to claim 1, wherein at least two interchangeable cartridges, each being adjusted independently of one another in a direction parallel to the axis of rotation, are arranged at an angular distance from one another on the cutting head.

19. The tool according to claim 1, wherein the cutting head has a base member and two tool holders connected to the base member by transversely extending serrations and a common clamping plate, said tool holders being radially adjustable with respect to the base member, each having an axially adjustable interchangeable cartridge therein and each having a said tapered ram adjustment mechanism aligned radially on the cutting head.

* * * * *

UNITED STATES PATENT AND TRADEMARK OFFICE
CERTIFICATE OF CORRECTION

PATENT NO. : 5 188 490

DATED : February 23, 1993

INVENTOR(S) : Werner MUENDLEIN et al

It is certified that error appears in the above-identified patent and that said Letters Patent is hereby corrected as shown below:

Column 5, line 27; delete ", which".

Signed and Sealed this

Thirtieth Day of November, 1993

Attest:

BRUCE LEHMAN

Attesting Officer

Commissioner of Patents and Trademarks